United States Patent
Rogers

(10) Patent No.: US 11,613,023 B2
(45) Date of Patent: Mar. 28, 2023

(54) EDGE DEVICE INTERFACE SYSTEM AND METHOD FOR MONITORING AND MODIFYING CONTROL AND RESPONSE SIGNALS TRANSMITTED TO AND FROM INJECTION-MOLDING MACHINES AND ROBOTS

(71) Applicant: Noble Plastics, Inc., Grand Coteau, LA (US)

(72) Inventor: Donald Scott Rogers, Lafayette, LA (US)

( * ) Notice: Subject to any disclaimer, the term of this patent is extended or adjusted under 35 U.S.C. 154(b) by 964 days.

(21) Appl. No.: 16/435,105

(22) Filed: Jun. 7, 2019

(65) Prior Publication Data

US 2020/0384652 A1  Dec. 10, 2020

(51) Int. Cl.
*B25J 11/00* (2006.01)
*B29C 45/42* (2006.01)
*B25J 9/16* (2006.01)
*H04L 67/1097* (2022.01)

(52) U.S. Cl.
CPC .......... *B25J 11/005* (2013.01); *B25J 9/1664* (2013.01); *B29C 45/42* (2013.01); *H04L 67/1097* (2013.01)

(58) Field of Classification Search
CPC ....... B25J 11/005; B25J 9/1664; B29C 45/42; B29C 2945/76993; B29C 45/766; H04L 67/1097; H04L 67/125; G05B 19/0423; G05B 19/41825; Y02P 90/02
See application file for complete search history.

(56) References Cited

U.S. PATENT DOCUMENTS

| | | | |
|---|---|---|---|
| 6,078,272 A | 6/2000 | Jacobs et al. | |
| 7,225,065 B1 | 5/2007 | Hunt et al. | |
| 9,842,934 B2 | 12/2017 | Yoo et al. | |
| 2008/0152752 A1* | 6/2008 | Klobucar | B29C 45/281 425/549 |

FOREIGN PATENT DOCUMENTS

CA    2713702    8/2009

* cited by examiner

*Primary Examiner* — Basil T. Jos

(57) ABSTRACT

An edge device interface system and method for monitoring, recording, and calculating control and response signals generated by and between an injection molding system including an injection-molding machine and a robotic handling device. The edge device interface system of the invention includes an edge device interposed between the connector of the injection-molding machine and the connector of a robotic handling device using standardized connectors. The edge device interface system may be interposed between the connector of the injection-mailing machine and the connector of a robotic handling device to emulate the function of either device as desired. The edge device interface system and method utilizes data observed both from standardized connectors and auxiliary inputs to provide insight into molding process steps and equipment, including what components of the injection molding system that may be contributing to any molding process instability or inefficiency, and for generating signals for real-time adjustment of the molding process.

20 Claims, 6 Drawing Sheets

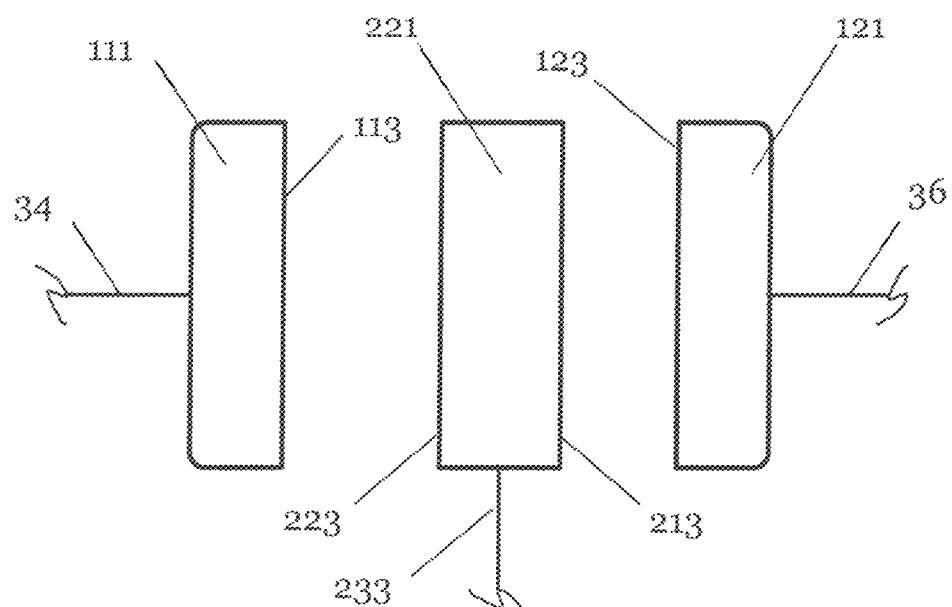
*Fig. 7*
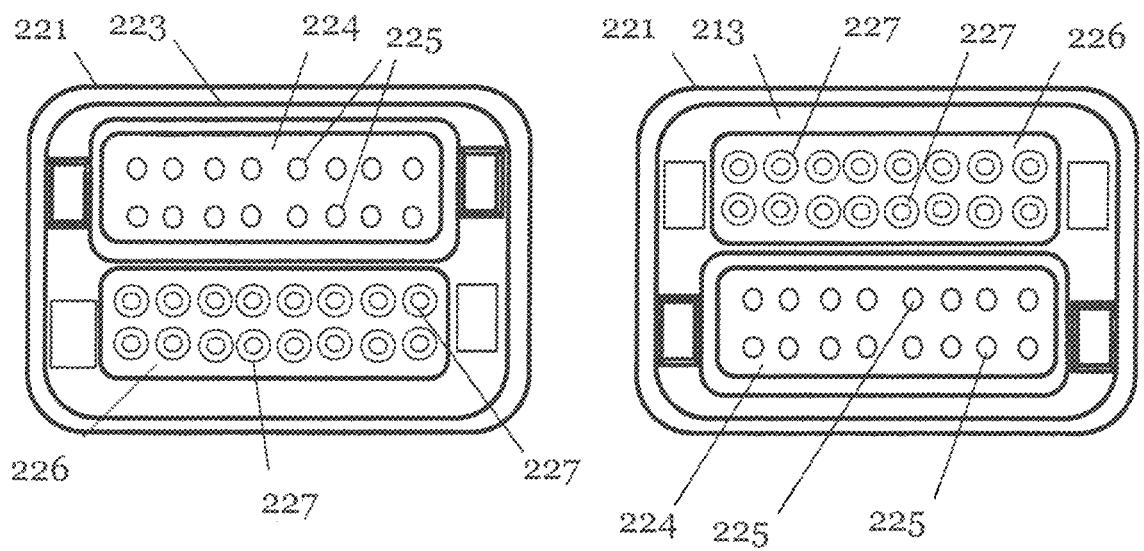
*Fig. 8*  *Fig. 9*

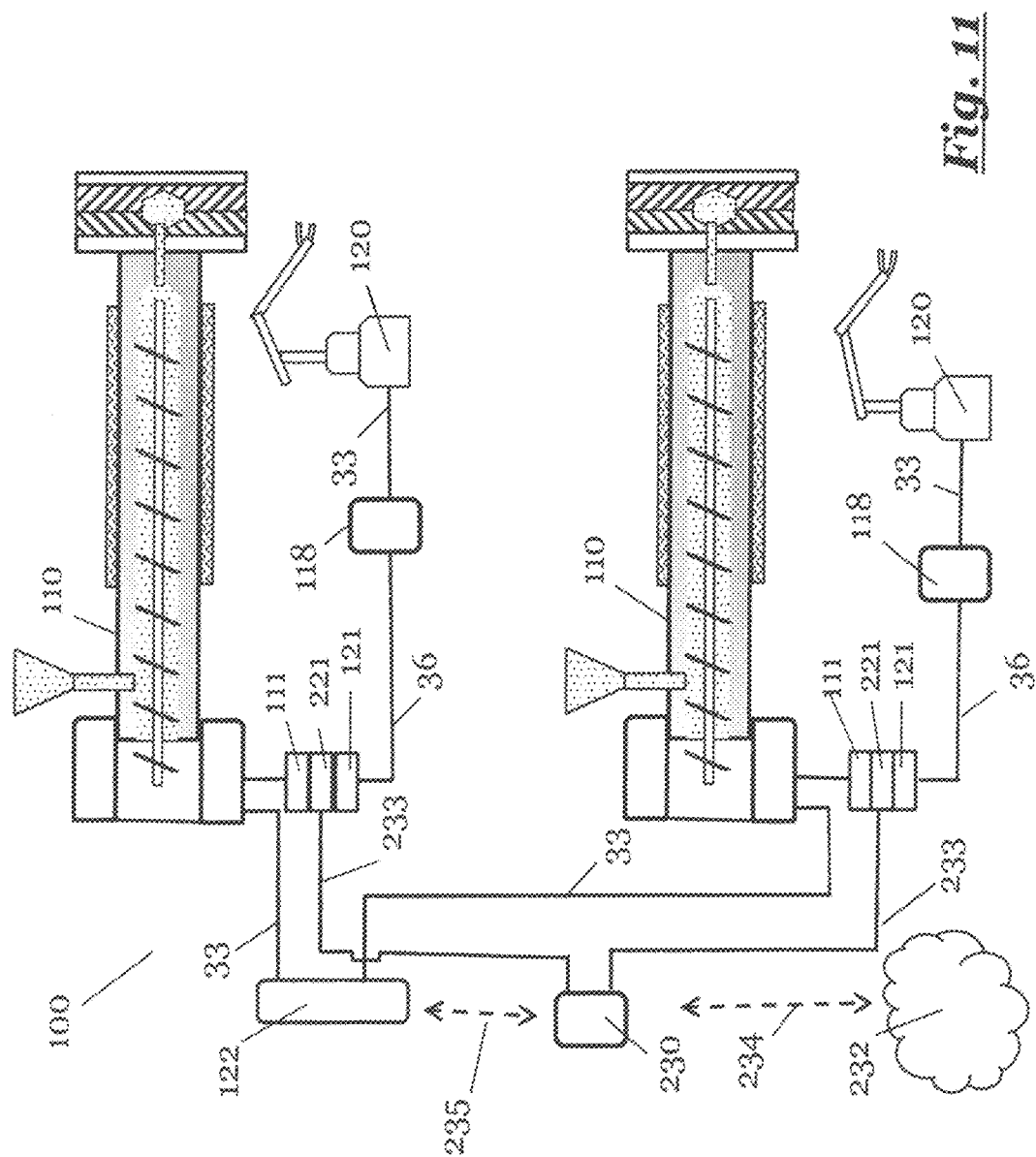

EDGE DEVICE INTERFACE SYSTEM AND METHOD FOR MONITORING AND MODIFYING CONTROL AND RESPONSE SIGNALS TRANSMITTED TO AND FROM INJECTION-MOLDING MACHINES AND ROBOTS

FIELD OF INVENTION

The subject invention relates to the field of injection molding of plastic and, more particularly, to an edge device interface system, and more particularly a device and method for monitoring, recording, analyzing, and manipulating the control and response signals used in conjunction with injection-molding machines and robotic systems.

BACKGROUND OF THE INVENTION

Robots and robotic arms are commonly used in conjunction with a plastic injection-molding machine (IMM) to provide an automated injection molding system. A robotic handling device, such as a robot or a robotic arm, in combination with an IMM is used for a variety of applications including robotic loading of product components into an IMM, robotic removal of molded products from an IMM, and robotic placement of molded products in a desired location such as onto conveyer belts where finished products are conveyed for inspection, further assembly, or for packaging as desired. An injection molding system employing one or more robots or robotic arms has multiple advantages including a reduction of variations in the molding process, increased product consistency, reduced waste, increased IMM utilization and production time, and reduced labor costs. The combination of robotic handling devices with one or more IMMs provides for a fluster and more efficient injection molding process, increased productivity, and a reduction in the cost of manufacture.

An automated injection molding system is typically comprised of at least one IMM; at least one robotic handling device; a programmable control system for the one or more IMMs and one or more robotic handling devices; and (typically one-to-one) connection interfaces between robotic handling device and IMM.

An IMM is typically comprised of at least one hopper holding a quantity of feedstock such as plastic granules; a heating chamber; a heater; a thermostat and heater temperature control; a feedstock port between the hopper and the heating chamber; and a segmented mold having at least one mold cavity and a port or sprue in fluid communication with the heating chamber, a stationary mold platen or mold plate supporting at least one segment of the segmented mold; and a movable or reciprocating mold platen or mold plate supporting at least one corresponding segment of the segmented mold.

A typical IMM is also comprised of a controllable feedstock injector, such as a rotating screw conveyor, positioned within the heating chamber to move molten feedstock from the heating chamber to and through the mold sprue and a controllable linear actuator, such as a pneumatic, hydraulic, mechanical, or electrical linear actuator, for moving the movable mold plate to mate the corresponding mold segments prior to injection of the molten feedstock into the mold cavity, exerting and relieving pressure on the mold segments, and for opening and closing the mold cavity to release a molded product.

Product production parameters for the molding process are established and input into the control system to generate control signals to the robotic handling device and to the IMM. These production parameters may include the rate and volume of feedstock introduced into the IMM heating chamber, the heater temperature, the temperature in the IMM heating chamber, the rate and volume of feedstock flowing through the IMM feed port, the temperature of the molten feedstock, and the position and stroke of the feedstock injector.

The control system for the IMM and the robotic handling device generates control signals for opening and closing a mold cavity, the time the mold cavity remains open or closed, the rate of injection of the molten feedstock into the mold cavity, the pressure and duration of pressure exerted on the mold by the mold plate, the duration of time the molten feedstock remains in the mold, the movement and position of the mold plate, and the number of molded products produced over a desired time. The control system for the IMM and the robotic handling device or robotic arm also generates control signals to the robotic handling device to manipulate and position the robot for robotic loading of product components into an IMM mold cavity, for robotic removal of molded products from an IMM mold cavity, and for robotic placement of molded products at a desired location.

The plastic injection molding process with an IMM and a robotic handling device comprises the steps of programming desired production parameters and molding process segment commands into the programmable computer control system; selecting a desired feedstock, typically a thermoplastic pellet; placing the selected feedstock into the hopper of the IMM, selecting a desired segmented product mold and mounting corresponding segments of the product mold on the stationary mold platen and reciprocating mold platen; generating control signals from the control system to the linear actuator to move the reciprocating mold platen and mate the corresponding mold segments; generating control signals from the control system to the heater to produce a desired heater temperature; generating control signals to introduce a desired quantity of feedstock into the heater chamber; and generating control signals from the control system to the feedstock injector and moving a quantity of the molten feedstock from the heating chamber to and through the mold sprue into the mold cavity.

The plastic injection molding process may be further comprised of the steps of generating control signals from the control system to the segmented mold to determine the temperature the pressure of the molten feedstock in the mold cavity, and the molding time; and generating control signals from the control system to the to the linear actuator to move the reciprocating mold platen and disengage the corresponding mold segments to open the mold. The plastic injection molding process may be further comprised of the steps of generating control signals from the control system to the robotic handling device to robotically load a product component into mold cavity, robotically removing the molded product from the mold cavity, and robotically placing the removed molded product at a desired location.

The connection between the IMM and the robotic handling device allows communication between the control system, the IMM and the robotic handling device to generate deliver, and receive control and response signals between these components to implement the molding process with the established input production parameters. These control and response signals establish and sequence the process segments of the molding process. The connection between the IMM and the robotic handling device will typically conform to international standards. Such connection standards have been adopted by Euromap (The European Committee of Machinery Manufacturers for the Plastics and Rubber Industries) and SPI established by The Plastics Industry Association (PLASTICS).

Euromap and SPI have adopted Euromap 67 (SPI AN 146) as the standard for a connection between the IMM and the robotic handling device requiring redundant control signal channels for security. Euromap and SPI have also adopted Euromap 12 (SPI AN 116) as the standard for a connection between IMM and robotic handling devices using single-control-signal channels.

A Euromap 12 compliant connector to an IMM is a 32-pin connector having two rows of pins having eight pins in each row and two rows of sockets having eight sockets in each row. A Euromap 12 is used for retrofit of injection molding machines that provide only single control channel security. A Euromap 12-compliant robotic handling device has a corresponding 32-pin connector having two rows of sockets having eight sockets in each row and two rows of pins having eight pins in each row.

The Euromap 67 compliant connector to an IMM is a 50-pin connector having three rows of sockets comprised of nine sockets, seven sockets, and nine sockets, respectively; and three rows of pins comprised of nine pins, seven pins, and nine pins, respectively, A Euromap 67-compliant robotic handling device has a corresponding 50 pin connector having three rows of pins comprised of nine pins, seven pins, and nine pins, respectively; and three rows of sockets comprised of nine sockets, seven sockets, and nine sockets, respectively.

SUMMARY OF THE INVENTION

This invention discloses an "edge device" interface system and method for monitoring, recording, analyzing and adjusting the control and response signals generated by and between injection-molding machines and robotic handling devices. The edge device interface system is comprised of an edge device interfaced between the connectors of an IMM and a robotic handling device that captures and transmits control and response signal data transmitted to and from the MM and a robotic handling device. The captured control and response signal data are then transmitted to a control mechanism having associated computational resources to record and analyze data.

The invention is so called because, from the point of view of the user, it sits at the "edge" of the injection-molding system process and allows recording and analysis of the many operational variables involved in that process; and allows adjustment of operational variables, guided by analysis, to be fed back into the process.

Because the edge device interface system can employ either local computational resources to record and analyze data interface-captured data via algorithmic processing during the molding process or record and analyze interface-captured via algorithmic processing by cloud-based computational resources, including computing and machine-learning software, it is an "edge device" from the point of view of information-network topology.

Because the edge device interface system incorporates standards-compliant connectors for both the IMMs and the robotic handling devices, it can be attached to an IMM, to a robotic handling device, or both. In the latter case, the edge device interface system is interposed between the connector of an IMM and the connector of a robotic handling device.

When connected to an IMM alone, the edge device interface system can perform its control-system, recording, analytical, and feedback functions independent of a robotic handling device, including simulation of signals generated by a robotic handling device functioning as a "virtual robot."

When connected to a robotic handling device alone, the edge device interface system can likewise record, respond to, and analyze signals emanating from the robotic handling device in order to calibrate or assess the function of the robotic handling device. The edge device can emulate and emit those signals produced by an IMM, acting as a "virtual IMM," in order to test the robotic handling device's function without requiring the use or presence of an IMM, and can employ cloud-computing resources to simulate injection-molding processes and the resulting signals that would be emitted from an IMM in order to fully evaluate the behavior of a robotic handling device connected to a physical IMM.

When acting as a "virtual robot" or "virtual IMM" the edge device alone or in conjunction can emulate either type of device from a variety of manufacturers and models, and the fidelity of the simulated behavior provided by the edge device's responses is limited only by the availability of information about the varying behavior of such varying models of IMMs and robotic handling devices. In all cases the edge device is capable of monitoring, recording, and analyzing signals traffic to and from robotic handling devices and IMMs, both real and virtual.

Typically the edge device interface system will utilize connectors that are Euromap 12 or Euromap 67 compliant connectors, or both. The edge device interface system may be configured to interface with and accept input and output signals to and from IMMs and robotic handling devices equipped with connections compliant with either standard.

Sensors, timers, processors and logical programs are incorporated with the edge device interface system to measure, record and compute a variety of molding and handling device process data, referred to herein as the "Computed Values". The Computed Values, by way of example only, may include the running time or duration of selected or all of the various molding process segments and steps. For example, a Computed Value may be determined by calculating and recording the time at the beginning and the end of each process segment, such as the time interval between when the mold begins to open or close and when the mold opening or closing is completed.

Auxiliary sensors may also be provided with the edge device interface system to deliver information to the edge device system via auxiliary sensor signal connections. By way of example, auxiliary sensors via auxiliary connections may be provided to receive, transmit, or analyze production parameters and molding process segment commands input into the control system, mold temperature and temperature variations, and feedstock temperature and temperature variations.

Such auxiliary connections may be in the form of any of a number of wired or wireless interfaces, including but not limited to those described by TIA (Telecommunications Industry Association) 232, commonly known as "RS-232;" those interfaces, such as RJ11, codified as registered jacks under 47 C.F.R. Part 68; those described by IEEE (Institute of Electrical and Electronics Engineers) RFC 802.3, commonly known as "Ethernet;" IEEE RFC 1394, sometimes known as "FireWire;" IEEE RFC 802.11, often described by the trade name "Wi-Fi", a registered U.S. trademark of the Wi-Fi Alliance; Bluetooth Special Interest Group standards collectively known as "Bluetooth;" or any of various Universal Serial Bus (USB) standards (all such interfaces, specified or not, collectively referred to herein as "Communications Standards").

The edge device interface system also can transmit information via any Communications Standard to and from a programmable logic controller (PLC), a commodity personal computer (PC), or remote computational resources.

Once recorded and manipulated, the Computed Values and other desirable data may then be utilized and manipulated to determine whether appropriate control signals are present, the presence of a mechanical defect in the molding equipment or the robotic handling equipment, and the efficiency of the molding process. Such manipulation and recording may include the production of charts and graphs showing changes in the recorded data or in Computed Values over time in order to provide a mechanism for monitoring the efficiency of the molding and robotic handling process. Analysis of the Computed Values, their variations, and the other recorded data will provide insight on the stability of the molding process and into what may be contributing to any molding process instability such as, problems with the mold, IMM mechanical systems, the heater, the temperature control, the feedstock injection, or the operations of the robotic handling device.

The edge device interface system may also include processors and other devices to generate control signals to make real-time adjustments to the process segments being implemented by the IMM and robotic handling device. Local or remote computational analysis of the Computed Values, their variations, and other recorded data may be used to determine variations between the production parameters for the process segments selected and input into the control system and Computed Values of those process segments as performed. Such an analysis may include whether a particular process parameter, such as feedstock temperature, or a process segment, such as molding time, is being implemented as originally input into the control system. When such determination is made the edge device interface system may then generate control signals to automatically make real-time adjustments to fine tune the molding process.

Control signals to IMMs and robotic handling devices by the edge device interface system may include timing or duration signals; proceed or stop signals; or other process parameter signals. The edge device interface system may employ interface-connection signals standards (e.g. Euromap 12 or 67) to transmit certain control signals. The edge device may employ other Communications Standards to change other process parameters by communication either with IMM or robot handling device, or in conjunction with other controlling devices.

The edge device interface system and method of the invention includes modifying existing systems consisting of one or more IMMs typically connected to and controlled by one or more robotic handling devices, by connecting one or more of either IMM or robotic handling devices to the edge device interface system.

An advantage of the edge device interface system and method of the invention is the use of connectors that conform to Euromap and SPI standards for connectors between an IMM and a robotic handling device.

Another advantage of the edge device interface system and method of the invention is the use of connectors that conform to one or more Communications Standards to permit transmission and receipt of information to or from local or remote computational resources, and use of that information to adjust process parameters of IMM or robotic handling device or both.

Another advantage of the edge device interface system is the ease of attaching and detaching the edge device interface system to an IMM or robotic handling device.

Another advantage of the edge device interface system is that it may be readily and easily attached to an existing IMM and a robotic handling device.

Another advantage of the edge device interface system is that it can be designed to operate to require only signaling power for operation, without bringing either IMM or robotic handling device interface-connection electrical signals to fall out of specification.

Another advantage of the edge device interface system is that it may be semi-permanently attached to one or more IMMs or robotic handling devices and remain so attached to either IMM or robotic handling device, respectively. The edge device interface system then may be detached as desired and then re-connected with another of one or more robotic handling devices, respectively. In this manner the edge device interface system can "stay with" a single IMM or robotic handling device for information-gathering, recording, analysis, and modification while associated IMM or robotic handling devices are connected to any other device.

Another advantage of the edge device interface system and method of the invention is that the recorded data and Calculated Values may be recorded and calculated over desired time intervals so that the efficiency of the IMM and robotic handling devices and the associated components may monitored and evaluated over desired time intervals to determine the cause of system and component inefficiencies or failures.

Another advantage of the edge device interface system and method of the invention is that the recorded data and Calculated Values may be recorded in and analyzed in the cloud as well as with other associated data storage and data manipulation devices.

Another advantage of the edge device interface system and method of the invention is that the recorded data and Calculated Values may be transmitted to storage and data manipulation devices by wired or wireless devices using one or more Communications Standards.

Another advantage of the edge device interface system allows local or remote computational resources to generate control signals to automatically make real-time adjustments to the molding process or to robotic handling processes.

Other advantages of the edge device interface system and method of the invention will be apparent from the disclosures provided herein.

DESCRIPTION OF THE DRAWINGS

FIG. 7 is an exploded schematic drawing showing the edge device of the edge device interface system having a Euromap 12-compliant edge device connector face for connection with a Euromap 12-compliant robot connector of a robot and a Euromap 12-compliant edge device connector face for connection with a Euromap 12-compliant connector of injection-molding machine as shown in FIG. 2.

FIG. 8 is a schematic drawing of a connector face of the edge device of the edge device system of the present invention conforming to the Euromap 12 standard for connection to the connector of injection-molding machine as shown in FIG. 7.

FIG. 9 is a schematic drawing of a connector face of the edge device of the edge device system of the present invention conforming to the Euromap 12 standard for connection to the robot connector of a robot as shown in FIG. 7.

FIG. 11 is a schematic diagram of the edge device system 100 of the present invention configured with first and second injection-molding machines and first and second robot handling devices.

DESCRIPTION OF THE EMBODIMENTS

Figure 1:
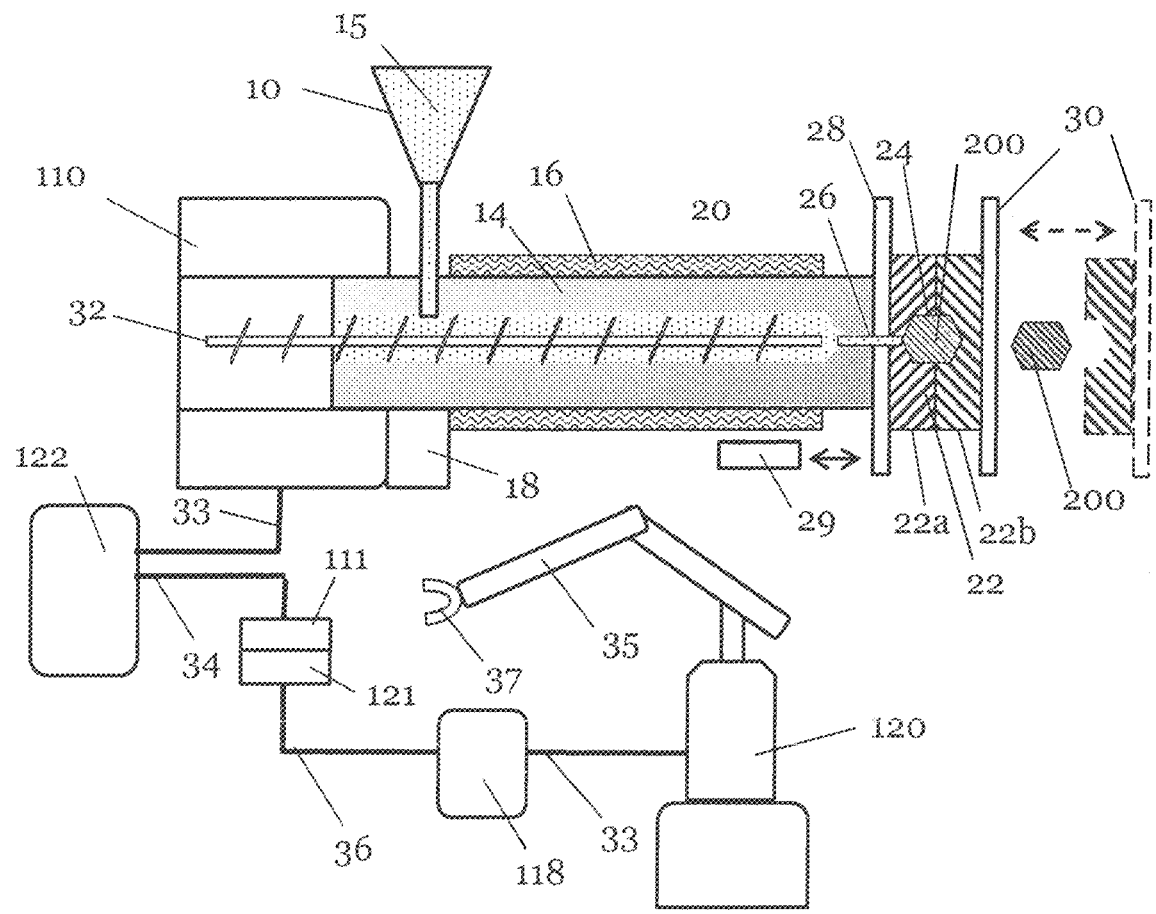
FIG. 1 is a schematic diagram of an exemplar embodiment of a configuration of an injection molding machine and robotic handling device without the associated edge device interface system of the present invention.

FIG. 1 is a schematic diagram of an exemplar embodiment of a configuration of an injection-molding machine (IMM) 110 and robotic handling device (Robot) 120 without an associated edge device interface system of the present invention. The IMM 110 and Robot 120 shown in FIG. 1 are mated with standardized connectors shown as Euromap 12-standard compliant connectors 111 and 121, respectively. IMM 110 and Robot 120 are connected by control signal lines 33 for operation with an IMM control mechanism 122 and a robot controller 118. Control mechanism 122 and robot controller 118 may include computer processors with computer storage and data processing and analysis capabilities and associated operating and processing software.

The IMM 110 in such a system is typically comprised of at least one hopper 10 holding a quantity of feedstock 15 such as plastic granules, a heating chamber 14, a heater 16, heater controls 18, a feedstock port 20 between the hopper 10 and the heating chamber 14, a segmented mold 22 having at least one mold cavity 24 and a port or sprue 26 in fluid communication with the heating chamber 14, a stationary mold platen or mold plate 28 supporting at least one mold segment 22a of the segmented mold 22 for molding a product 200; a movable or reciprocating mold platen or mold plate 30 supporting at least one opposing mold segment 225 of the segmented mold 22, and actuator 29 for reciprocating mold plate 30; controllable feedstock injector 32 such as a rotating screw conveyor, and a Euromap 12- or 67-standard compliant connector 111 to IMM control lines 34 for delivery of control signals to the IMM. The Robot 120 in such a system is typically comprised of a rotatable, articulated control arm 35 having a pincer 37 and a Euromap 12- or 67-standard compliant robot connector 121 to control lines 36 for delivery of control signals to the Robot 120.

Figure 2:
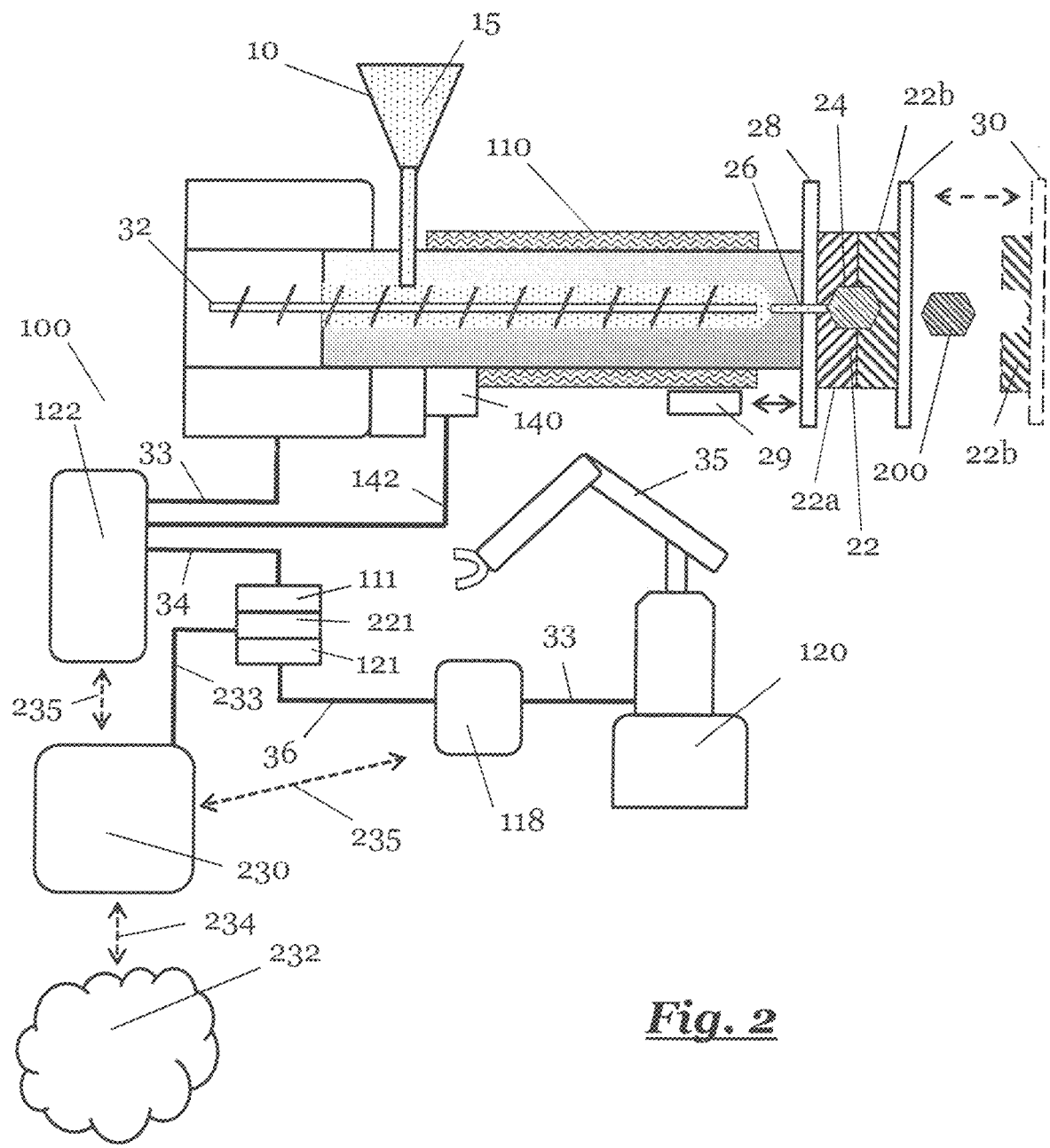
FIG. 2 is a schematic diagram of the edge device system of the present invention coupled with the injection-molding machine and robotic handling device shown in FIG. 1.

FIG. 2 is a schematic diagram of the edge device system 100 of the present invention coupled with the IMM 110 Robot 120 shown in FIG. 1. The edge device system 100 is comprised of an edge device 221 that is interposed between and mated with IMM connector 111 and with robot connector 121 of Robot 120. Edge device 221 is connected for operation with an analysis system 230 by edge device signal lines 233. Auxiliary sensors 140 or other information-gathering devices may be included with IMM 110 or with Robot 120 to receive, transmit, record, and analyze information generated by sensors 140 via sensor signal lines 142 to and from control mechanism 120. Such information may include mold temperature and temperature variations, and feedstock temperature and temperature variations and responses to production parameters and molding process segment commands input into the control system.

Edge device 221 is a connector-processor configured to interface with IMM connector 111 of IMM 110 and robot connector 121 of Robot 120 and receive and capture the control and process data signals generated to and from the IMM 110 and the Robot 120 and to deliver the captured data signals via edge device signal lines 233 to analysis system 230. Analysis system 230 is provided with computer storage and data processing and analysis capabilities and associated operating and processing software. Analysis system 230 may be provided as a separate computer processer or as a component of control mechanism 122. Analysis system 230 may also be wirelessly coupled, via cloud signals 234, to an internet or cloud-based analysis system 232 configured to interact with analysis system 230, edge device 221, control mechanism 122 and/or robot controller 118 for storage, software, processing and analysis of the captured control and process data signals generated to and from the IMM 110 and the Robot 120.

In the above configurations, edge device 221 of the edge device interface system 100 is mated to IMM connector 111 and robot connector 121 to receive control and response signals delivered and interchanged between IMM 110 and the Robot 120 and to transmit, via edge device signal lines 233, the received control and response signals from edge device 221 to analysis system 230 and/or cloud-based analysis system 230 and/or control mechanism 122 the for monitoring, recording, analysis and, if desired, via auxiliary control signal lines 235, to control mechanism 122 and/or robot controller 118 for adjusting the control signals delivered to IMM 110 and Robot 120. Control lines 33, edge device signal lines 233, and auxiliary control signal lines 235 may be hard-wired lines or they may be wireless lines.

Edge device 221 may be removably attached to IMM connector 111 and robot connector 121 to facilitate is connection with IMM connector 111 and robot connector 121 and to facilitate its use with other IMM and Robot devices.

Figure 3:
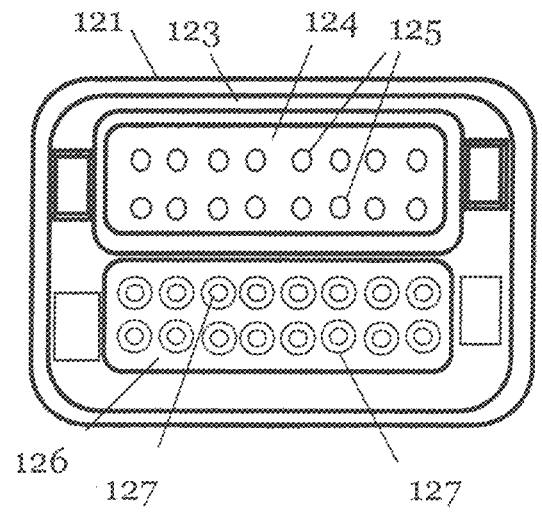
FIG. 3 is a schematic drawing of the connector face of the robot connector conforming to the Euromap 12 standard for connecting a robotic handling device to the connector face of the injection-molding machine connector of the injection-molding machine as shown in FIG. 2.

FIG. 3 is a schematic drawing of the connector face 123 of robot connector 121 conforming to the Eurormap 12 standard for connecting Robot 120 to the connector face 113 of IMM connector 111 of the IMM 110 as shown in FIG. 2. Robot connector 121 is a 32-pin connector having a pin-portion 124 comprised of sixteen pins 125 arranged in two rows, each with eight pins 125, and a socket-portion 126 comprised of sixteen sockets 127 arranged in two rows, each with eight sockets 127.

Figure 4:
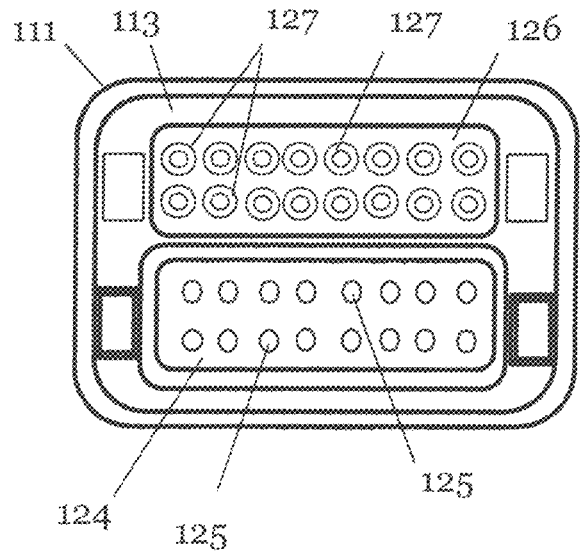
FIG. 4 is a schematic drawing of the connector face of the injection-molding machine connector conforming to the Euromap 12 standard for connecting the injection-molding machine to the robot connector of a robotic handling device as shown in FIG. 2.

FIG. 4 is a schematic drawing of the connector face 113 of IMM connector 111 conforming to the Euromap 12 standard for connecting the IMM 110 to the connector face 123 of robot connector 121 of the Robot 120 as shown in FIG. 2. IMM connector 111 is also a 32-pin connector that corresponds with robot connector 121 and it has a connector face 113 with a socket-portion 126 comprised of sixteen sockets 127 arranged in two rows, each with eight sockets 127, and a pin-portion 124 comprised of sixteen pins 125 arranged in two rows, each with eight pins 125.

In some applications, the IMM 110 and Robot 120 shown in FIG. 1 are mated with Euromap 67-standard compliant connectors 311 and 321, respectively, rather than Euromap 12-standard compliant IMM connector 111 and robot connector 121.

Figure 5:
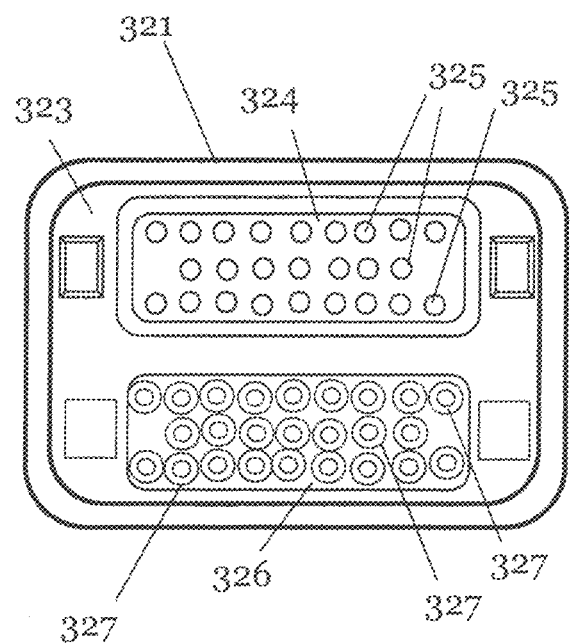
FIG. 5 is a schematic drawing of the connector face of a Euromap 67-compliant connector for connecting a robotic handling device to the connector face of the injection-molding machine connector of the injection-molding machine as shown in FIG. 2.

FIG. 5 is a schematic drawing of the connector face 323 of Euromap 67-compliant connector 321 for connecting a Robot 120 to the connector face 113 of IMM connector 111 shown in FIG. 4. Euromap 67-compliant connector 321 is a 50 pin connector having a pin-portion 324 with three rows of pins 325 comprised of nine pins 325, seven pins 325, and nine pins 325, respectively; and a socket-portion 326 with three rows of sockets 327 comprised of nine sockets 327, seven sockets 327, and nine sockets 327, respectively.

Figure 6:
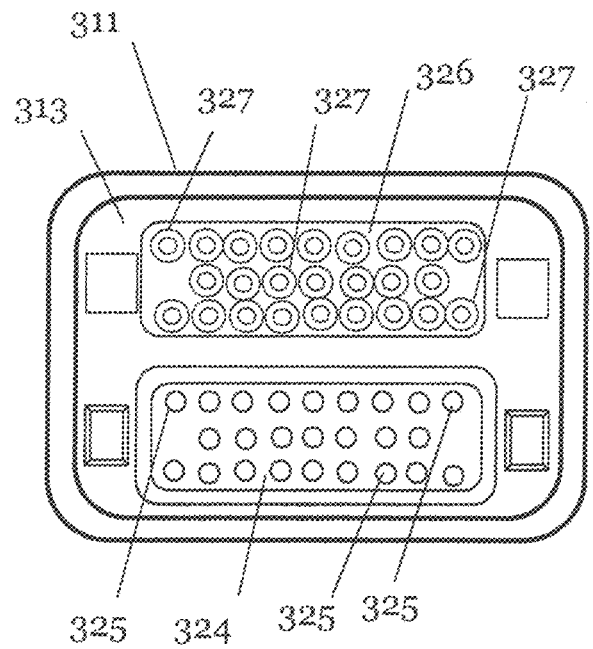
FIG. 6 is a schematic drawing of the connector face of Euromap 67-compliant connector for connecting an injection-molding machine to the connector face of a robotic handling device as shown in FIG. 2.

FIG. 6 is a schematic drawing of the connector face 313 of Euromap 67-compliant connector 311 for connecting an IMM 110 to the connector face 123 of Robot connector 121 as shown in FIG. 3. Connector 311 is a 50-pin connector corresponding to connector 321 and it also has a socket-portion 326 with three rows of sockets 327 comprised of nine sockets 327, seven sockets 327, and nine sockets 327, respectively; and a pin-portion 324 with three rows of pins comprised of nine pins, seven pins, and nine pins, respectively.

FIG. 7 is an exploded schematic drawing showing edge device 221 of edge device interface system 100 having a Euromap 12-compliant edge device connector face 213 for connection with connector face 123 of Euromap 12-compliant robot connector 121 of a Robot 120 and a Euromap 12-compliant edge device connector face 223 for connection with connection face 113 of Euromap 12-compliant IMM connector 111 of an IMM 110. It will be readily seen that another embodiment of edge device 221 of edge device interface system 100 may be configured with Euromap 67-compliant connector faces to interface with Euromap 67-compliant connectors 321 and 311 of a Robot 120 and an IMM 110, respectively.

FIG. 8 is a schematic drawing of the connector face 223 of edge device 221 conforming to the Euromap 12 standard for connection to the connection face 113 of IMM connector 111 of an IMM 110. Connector face 223 of edge device 221 is a 32-pin connector that corresponds with connector face 113 of IMM connector 111 and has a pin-portion 224 comprised of sixteen pins 225 arranged in two rows, each with eight pins 225, and a socket-portion 226 comprised of sixteen sockets 227 arranged in two rows, each with eight sockets 227.

FIG. 9 is a schematic drawing of the connector 213 of edge device 221 conforming to the Euromap 12 standard for connection to the connector face 123 of robot connector 121 of a Robot 120. Connector face 213 of edge device 221 is a 32-pin connector that corresponds with connector face 123 of robot connector 121 and has a socket-portion 226 comprised of sixteen sockets 227 arranged in two rows, each with eight sockets 227, and a pin-portion 224 comprised of sixteen pins 225 arranged in two rows, each with eight pins 225.

Edge device interface system 100 can be constructed from commodity hardware including interface connections that comply of standards-compliant IMM connectors 111 and robot connectors 121. The internal logic and/or external hardware anti software necessary for control mechanism 122, edge device 221, analysis system 230 or cloud-based analysis system 232 to appropriately program, transmit, and control the function of IMM 110 and Robot 120 may be readily developed by skilled computer programmers and hardware engineers, including the hardware necessary to deploy various Communications Standards; signals-processing hardware for interception and transmission of standards-compliant control signals between IMM 110 and Robot 120; hardware necessary for recording and/or local analysis of data and computation and storage or Computed Values; and software necessary to perform ail of the above functions.

The plastic injection molding process with an IMM 120 and a Robot 120 is comprised of the steps of programming control mechanism 122 with desired production parameters and molding process segment commands; selecting a desired feedstock 15, typically a thermoplastic pellet; placing the selected feedstock into the hopper 10 of the IMM 110; selecting a desired segmented product mold 22 and mounting corresponding segments 22a and 22b of the product mold 22 on the stationary mold platen 28 and reciprocating mold platen 30; generating control signals from the control mechanism 122 to the linear actuator 29 to move the reciprocating mold platen 30 and mate the corresponding mold segments 22a and 22b; generating control signals from the control mechanism 122 to the heater 16 to produce a desired heater temperature; introducing a desired quantity of feedstock 15 into the heater chamber 14; activating the feedstock injector 32 and moving a quantity of the molten feedstock 15 from the heating chamber 14 to and through the mold sprue 26 into the mold cavity 24.

The plastic injection molding process may be further comprised of the steps of generating control signals from the control system to the linear actuator 29 to move the reciprocating mold platen 30 and disengage the corresponding mold segments 22a and 22b to open the mold 22. The plastic injection molding process may be further comprised of the steps of generating control signals from the control mechanism 122 or the robot controller 118 to the Robot 120 and robotically removing the molded product 200 from the mold cavity 24, and robotically placing the removed molded product 200 at a desired location.

It will readily be seen that any of the embodiments of edge device interface system 100 may be configured to transmit and receive information or signals via one or more wireless Communications Standards.

Figure 10:
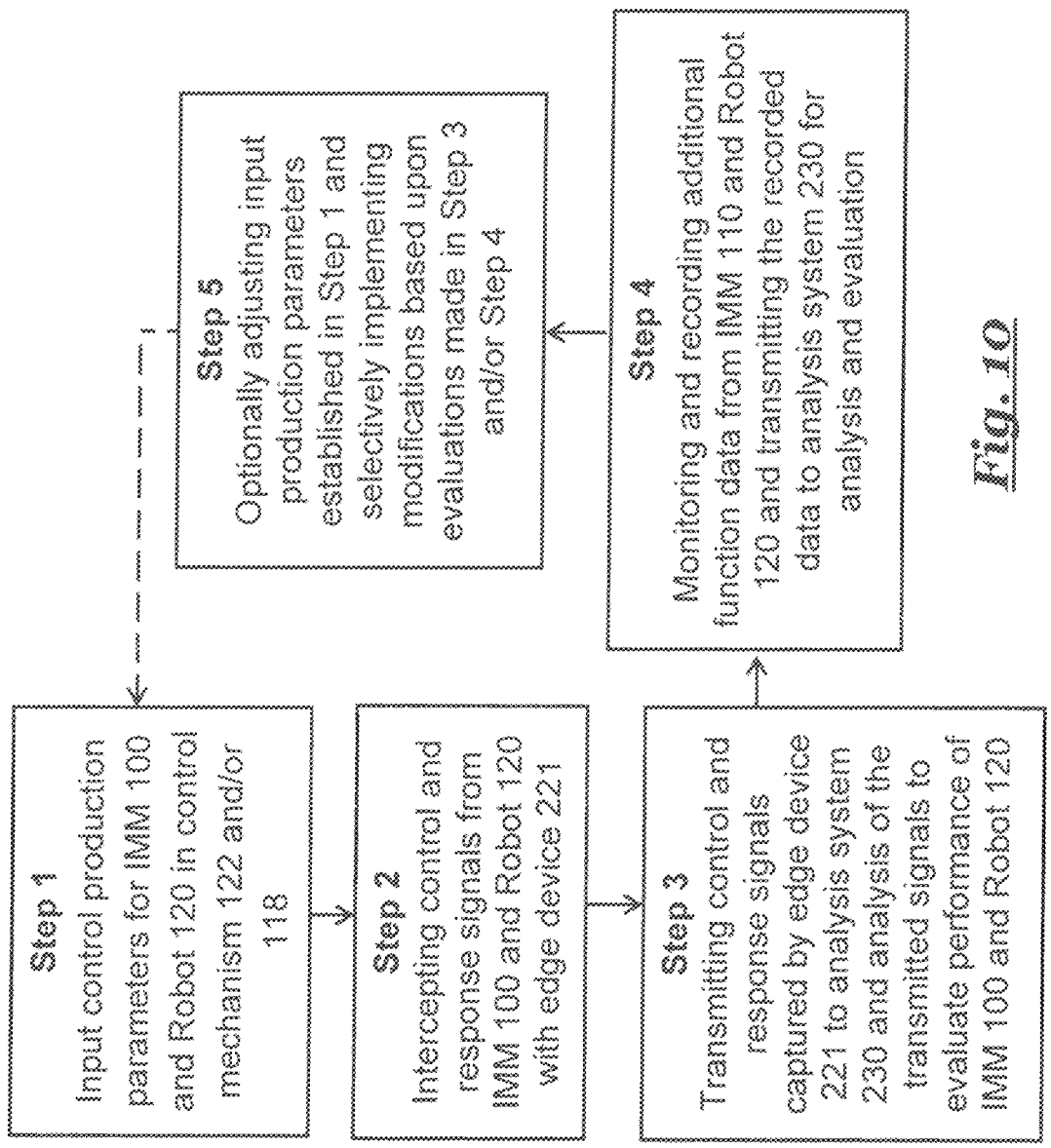
FIG. 10 is a flow chart diagram of the method steps for use of edge device interface system of the present invention 100 in conjunction with at least one injection-melding machine and one robot handling device.

FIG. 10 is a flow chart diagram of the method steps of the present invention for use of edge device interface system 100 in conjunction with at least one of IMM 110 and Robot 120. The method includes a multi-step process commencing first with programming either of IMM 110 or Robot 120 with desired input production parameters (Step 1) for operation and cooperation IMM 100 and Robot 120. Step 1 includes but is not limited to entering input data to control mechanism 122 for the type, rate and total volume of feedstock 15 necessary to produce a desired quantity of the desired molded product 200; the heating parameters necessary for IMM 110 to the molten feedstock; and input data for feedstock injection, mold-close, time, and total cycle time specific to product 200 being molded. Step 1 includes entering input data to the control mechanism 122 for the control of the Robot 120 for retrieval and placement of the product 200.

Step 2 includes interception of signals between IMM 110 and Robot 120 (if present) by edge device 221 of edge device interface system 100 through interface connection faces 213 and 223, and performing (Step 2a) any of a variety of signals processing, local or remote recording, transmission, local or remote analytics, and computation by analysis system 230 or with the associated cloud-based analysis system 232 of edge device interface system 100.

Step 3 comprises generating control and response signals to and from the IMM 110 and the Robot 120, including signals from the control mechanism 122, to perform the various stages of the molding process (Step 3a); monitoring and recording selected molding process data collected by the edge device 221 from the IMM 120 and the Robot 120 during the molding process stages (Step 3b); communicating the molding process data from the edge device 221 to the control mechanism 122 or associated analysis system 230 or cloud-based analysis system 232 of edge device interface system 100 for analysis of the communicated data (Step 3c). Step 3 may also include the additional step (Step 3d) of transmitting control signals from associated analysis system 230 or cloud-based analysis system 232 to control mechanism 122 and/or robot controller 120 via edge device interface system 100 for generating changes to the control signals for the IMM 110 and Robot 120.

Step 3a includes generating control and response signals from control mechanism 122 to and from the IMM 110 for control of the molding process steps of feedstock provisioning and heating, thermoplastic feedstock injection, mold opening, removal of molded product, and mold closing. Step 3a may also include generating control and response signals from robot controller 118 to and from Robot 120 for control of the responses and movement of the Robot 120 during the performance of these steps.

Step 3b includes using the edge device interface system 100 for monitoring and recording the control and response signals generated in Step 3a as well as additional molding process information obtained by sensors 140 either integral to or external to IMM 110, including but not limited to feedstock temperature, mold pressure, and other variables.

Step 3c includes utilizing the edge device interface system 100 for communication with local or remote storage and connected computer processing and computation devices to transmit monitored and recorded data or Computed Values; and computation locally or by remote computer processing and computation devices of Computed Values or higher-order information derived therefrom, including algorithmic processing or machine-learning, with or without control feedback.

Step 3d includes the transmission of control signals from edge device interface system 100 to at least one of IMM 110 and Robot 120, for example to control product outcomes, like dimensions of product 200, for example by signaling IMM 110 to shorten or extend mold-close time; or by triggering (directly or by default) functions of DAM 110 like time-out and cycle interruption. A wide variety of adjustments to the function of IMM 110 may be accomplished at Step 3d, both by use of the standardized interface connection and/or by signals inputs communicated to auxiliary devices via various Communications Standards.

Step 4 comprises monitoring additional functions of IMM 110 and Robot 120 via edge device interface system 100, such as mold-open, core pull, and manipulation of molded product 200 by Robot 120. In Step 4 selected data may be monitored and recorded by edge device interface system 100 during the performance of these additional functions and transmitted to analysis system 230 or cloud-based analysis system 232 for processing and analysis. Step 4 may include, as desired, transmitting control signals from analysis system 230 or cloud-based analysis system 232 to control Mechanism 122 and/or robot controller 118 via edge device interface system 100 to Robot 120 and/or IMM 110, for example to affect product handling, finishing, or placement by Robot 120 and to dictate whether and how the desired production parameters established in Step 1 for the IMM 110 and Robot 120 should be modified.

Step 5 includes any adjustment of those input production parameters established in Step 1 by analysis system 230 or cloud-based analysis system 232 based on observed data, Computed Values, local- or remote-computed algorithmic control inputs to implement for example test runs, and other potential modifications to input production parameters.

The edge device interface system 100 may also be configured with one or more IMMs 100 and one or more robots 120 or one IMM 110 and one or more robots 120 or one Robot 120 with one or more IMMs 110. FIG. 11 is a schematic diagram of the edge device system 100 of the present invention configured with a first and a second IMM 100 and a first and a second Robot 120.

The description and drawings provided herein are to show only exemplary embodiments of the edge device interface system (100) of the present invention incorporated with at least one of an IMM and a robotic handling device. Changes may also be made in the form, construction, and arrangement of the components of the parts of the invention described without departing from the spirit and scope of the invention or sacrificing any of its material advantages.

I claim:

1. An edge device interface system apparatus for receiving, processing, analyzing, and transmitting signals generated before, during, and after operation of injection-molding machines, comprising:
   a) at least one injection-molding machine;
   b) a control mechanism generating and receiving injection-molding machine data signals to and from said injection-molding machine;
   c) an edge device interfacing said injection molding machine whereby said data signals generated to and from said injection-molding machine may be received and captured; and
   d) an analysis system whereby said received and captured injection-molding machine data signals are delivered from said edge device and stored, processed, and analyzed.

2. The edge device interface system apparatus as recited in claim 1, further comprising:
   a) at least one robotic handling device interfacing with said edge device whereby data signals generated to and from said robotic handling device may be received and captured by said edge device; and
   b) wherein said received and captured robotic handling device data signals are delivered from said edge device to said analysis system and stored, processed, and analyzed.

3. The edge device interface system apparatus as recited in claim 2, wherein said received and captured injection-molding machine data signals and said received and captured robotic handling device data signals are transmitted to and from said analysis system wirelessly.

4. The edge device interface system apparatus as recited in claim 3, wherein said analysis system includes a cloud-based analysis system.

5. The apparatus as recited in claim 4, wherein said edge device interfaces with said injection-molding machine and with said robotic handling device by Euromap standard compliant connectors.

6. The edge device interface system apparatus as recited in claim 5, further comprising sensors with said injection-molding machine whereby molding process information data signals are monitored and captured.

7. The edge device interface system apparatus as recited in claim 4; further comprising a plurality of injection-molding machines and a plurality of robotic handling devices each having connectors interfaced by a said edge device.

8. A method for monitoring receiving, processing, analyzing, transmitting and modifying control and response signals transmitted to and from an injection-molding machine and a robotic handing device comprising the steps of:
 a) providing at least one injection-molding machine;
 b) providing at least one robotic handling device;
 c) interfacing said at least one injection-molding machine and said at least one robotic handling device whereby data signals are exchanged between said at least one injection-molding machine and said at least one robotic handling device;
 d) providing an edge device and interfacing said edge device with said injection molding machine and said robotic handling device whereby said exchanged data signals generated to and from said injection-molding machine and said robotic handling device may be captured;
 e) capturing said exchanged data signals generated to and from said injection-molding machine and said robotic handling device with said edge device;
 f) transmitting said captured exchanged data signals generated to and from said injection-molding machine and said robotic handling device from said edge device to an analysis system; and
 g) storing, processing, and analyzing said captured exchanged data signals generated to and from said injection-molding machine and said robotic handling device with said analysis system.

9. The method as recited in claim 8, wherein said analysis system receives and transmits data signals wirelessly.

10. The method as recited in claim 9, further comprising the additional step of interfacing said edge device with said injection-molding machine and with said robotic handling device with Euromap standard compliant connectors.

11. The method as recited in claim 8, further comprising the additional steps of:
 a) providing at least one control mechanism for said injection-molding machine and said robotic handling device;
 b) entering input data to said at least one control mechanism and generating initial control signals for said injection-molding machine and said robotic handling device;
 c) transmitting said generated initial control signals for said injection-molding machine and said robotic handling device from said at least one control mechanism to said injection-molding machine and to said robotic handling device whereby initial molding process parameters are established; and
 d) transmitting said generated initial control signals for said injection-molding machine and said robotic handling device to said analysis system.

12. The method as recited in claim 11, further comprising the additional steps of:
 a) analyzing said captured exchanged data signals and said generated initial control signals with said analysis system;
 b) modifying said generated initial control signals in response to said analysis of said captured exchanged data signals and said generated initial control signals;
 c) transmitting said modified initial control signals to said at least one control mechanism; and
 d) selectively transmitting said modified initial control signals to said injection-molding machine and to said robotic handling device as desired thereby modifying said initial molding process parameters.

13. The method as recited in claim 12, wherein said analysis system is a cloud-based analysis system.

14. The method as recited in claim 13, further comprising the additional step of interfacing said edge device with said injection-molding machine and with said robotic handling device with Euromap standard compliant connectors.

15. The method as recited in claim 14, further comprising the additional steps of:
 a) providing sensors with said injection-molding machine to monitor and capture molding process information data signals;
 b) capturing said molding process information data signals from said sensors to said at least one control mechanism;
 c) transmitting said captured molding process information data signals to said analysis system;
 d) storing, processing, and analyzing said captured molding process information data signals; and
 e) whereby modifying said generated initial control signals includes modifying said generated initial control signals in response to said analysis of said captured molding process information data signals.

16. The method as recited in claim 15, wherein said captured molding process information data signals include feedstock temperature and mold pressure.

17. The method as recited in claim 14, further comprising the additional step of generating simulated robot and injection-molding machine control and response signals to and from said edge device.

18. In an injection-molding machine and robotic handling device combination having interfacing robotic handing device and injection-molding machine connectors and a control mechanism: an edge device interface system comprising:
 a) an edge device interfacing with interfacing robotic handing device and injection-molding machine connectors whereby data signals generated to and from said injection-molding machine and said robotic handling device may be received and captured; and
 b) an analysis system in combination with said edge device whereby said data signals received and captured by said edge device are delivered, stored, processed, and analyzed.

19. In the injection-molding machine and robotic handling device combination as recited in claim 18 wherein said data signals received and captured by said edge device are delivered to said analysis system wirelessly.

20. In the injection-molding machine and robotic handling device combination as recited in claim 19 wherein said interlacing robotic handing device and injection-molding machine connectors and said interlacing edge device include interfacing standard compliant connectors.

* * * * *